United States Patent
Iwasaki et al.

(10) Patent No.: US 9,951,863 B2
(45) Date of Patent: Apr. 24, 2018

(54) TRANSMISSION

(71) Applicant: HONDA MOTOR CO., LTD., Tokyo (JP)

(72) Inventors: Toru Iwasaki, Wako (JP); Mitsuhiro Nakamura, Wako (JP); Hiroyuki Yoneyama, Wako (JP); Akira Nakamura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 414 days.

(21) Appl. No.: 14/706,145

(22) Filed: May 7, 2015

(65) Prior Publication Data

US 2015/0345618 A1  Dec. 3, 2015

(30) Foreign Application Priority Data

Jun. 2, 2014  (JP) .................................. 2014-114415

(51) Int. Cl.

| | |
|---|---|
| *F16H 59/70* | (2006.01) |
| *F16H 63/42* | (2006.01) |
| *F16H 59/68* | (2006.01) |
| *F16H 59/40* | (2006.01) |
| *F16H 59/42* | (2006.01) |

(52) U.S. Cl.
CPC ............ *F16H 59/70* (2013.01); *F16H 63/42* (2013.01); *F16H 59/40* (2013.01); *F16H 59/42* (2013.01); *F16H 2059/6823* (2013.01); *F16H 2059/706* (2013.01)

(58) Field of Classification Search
None
See application file for complete search history.

(56) References Cited

FOREIGN PATENT DOCUMENTS

| | | |
|---|---|---|
| DE | 199 08831 A1 | 9/2000 |
| DE | 10 2004 001 880 A1 | 8/2005 |
| EP | 1 271 005 A2 | 1/2003 |
| FR | 2826087 A1 | 12/2002 |
| JP | 03-011170 U1 | 2/1991 |
| JP | 2008-039111 A | 2/2008 |
| JP | 4404096 B2 | 1/2010 |

(Continued)

OTHER PUBLICATIONS

EP 1271005 A2 Translation.*

(Continued)

*Primary Examiner* — Ramya P Burgess
*Assistant Examiner* — Timothy Hannon
(74) *Attorney, Agent, or Firm* — Squire Patton Boggs (US) LLP

(57) ABSTRACT

A controller is configured to determine a current gear ratio step determined on the basis of gear ratio calculation Rg to be actual gear ratio of revolution Nm of main shaft $3a$ and revolution Nc of counter shaft $3b$ as well as gear ratio map for defining gear ratio variable allowance range for each of gear ratio steps. When making a decision of status of the determined current gear ratio step, the controller is configured to make delay timer get started when the gear ratio calculation Rg goes within the gear ratio variable allowance range of next step and halt to make a decision of the current gear ratio step while the delay timer is activated. The controller is also configured to make a decision of the status of the current gear ratio step after a predetermined delayed time $Tn^*(n=1, 2, \ldots)$ is elapsed.

15 Claims, 6 Drawing Sheets

(56) References Cited

FOREIGN PATENT DOCUMENTS

JP          2013-194868 A    9/2013
WO             0052363 A1    9/2000

OTHER PUBLICATIONS

DE 19908831 A1 Translation.*
Japanese Notice of Reasons for Rejection (Office Action) Application No. P2014-114415 dated Jan. 10, 2017.
European Search Report application No. 15169407.2 dated Oct. 13, 2015.

* cited by examiner

TRANSMISSION

RELATED ART

This invention relates to an automobile transmission, and more specifically, an automobile transmission which can preferably prevent a controller from erroneous detection of a current gear ratio step to rapidly and accurately detect the current gear ratio step regardless of clutch engagement.

BACKGROUND

In order to rapidly and accurately detect a status of current gear ratio steps of automobile manual transmission, a method has been disclosed which shift position sensors to detect respective current gear ratio steps are respectively provided to gear ratio change mechanism of the transmission. The method has a merit to accurately detect the current gear ratio step, but has a demerit to make a product cost to increase due to complex structure with the same number of the shift position sensors as number of the gear ratio steps.

Meanwhile, a gear ratio indicating apparatus as described in patent document 1: Publication No. JP2008-39111, has also been disclosed which, instead of providing the shift position sensors to the gear ratio change mechanism, a current gear ratio step is supposed to be determined based on signals outputted by two rotational speed sensors which are disposed in input shaft side and output shaft side, respectively.

A gear-position determination apparatus as described in patent document 2: Japan Patent No. 4404096, has also been disclosed which a current gear ratio step is supposed to be determined based on ratio of an engine revolution and a vehicle speed calculated from signals outputted by an engine revolution sensor and a vehicle speed sensor, respectively.

In the gear ratio indicating apparatus as described in the patent document 1, there has a merit to prevent increase of product cost with respect to whole transmission system, because a determination of current gear ratio step is conducted based on the two rotational speed sensors disposed on the input and output shafts and consequently, the structure of electrical signal system becomes to be simplified.

However, when the revolution is not stable due to twist vibration and backlash generating in drive train at time right after a synchronizer has completed to engage with a target gear or when a synchronizer has begun to move to engage with a target gear, it is impossible to calculate an accurate gear ratio based on the respective revolutions of the input and output shafts measured by those rotational speed sensors. In the result, a controller such as engine control unit possibly erroneously detects the current gear ratio step and, in worst case, possibly makes the indicating apparatus flash intermittently on and off. Furthermore, in a jumping upshift, i.e., 2 steps jumping upshift from 2nd to 5th gear ratio step, at the moment of passage of revolutions corresponding to intermediate gear ratio steps (3rd and 4th gear ratio steps in this case), the controller erroneously detects each of the intermediate gear ratio steps as a current gear ratio step as well.

Moreover, in the gear ratio determination apparatus as described in the Patent document 2, a current gear ratio step is supposed to be determined by differential value of vehicle speed in addition to ratio of the engine revolution and vehicle speed.

However, the engine revolution becomes to be temporarily unstable immediately after the clutch has disengaged from the engine. Consequently, the apparatus in the Patent document 2 has a problem that it is hard to accurately detect the current gear ratio step of the transmission. The apparatus additionally has another problem that it is hard to prevent the controller from erroneous detection of the current gear ratio step as long as the differential value of vehicle speed does not exceed a given threshold.

SUMMARY OF THE INVENTION

Therefore, the present invention is achieved to solve the above-mentioned problems. And the purpose of the present invention is to provide an automobile transmission which can prevent a controller from erroneous detection of a current gear ratio step to rapidly and accurately detect the current gear ratio step regardless of clutch engagement.

To solve the above-mentioned problems, a transmission comprising an input shaft receiving a drive torque transferred via a clutch from a power source; a synchronizer group having a plurality of synchronizer to select one of plural gear sequences; an output shaft transmitting to a final drive gear the drive torque rotationally changed by the selected gear sequence; a gear ratio calculation means for calculating an actual gear ratio based on revolutions of the input and output shafts detected by a first revolution detection means and a second revolution detection means, respectively; a gear ratio map for defining a gear ratio variable allowance range for a gear ratio step; a determination means of gear ratio step for determining a current gear ratio step by the actual gear ratio and the gear ratio variable allowance range; and a detection means of neutral condition for detecting a neutral condition of the gear ratio step; wherein the determination means of gear ratio step including a first timer for measuring a first given time, is configured to make the first timer get started and halt to make a decision of the current gear ratio step while the first timer is activated, when the gear ratio reaches a gear ratio variable allowance range corresponding to one upper step or one lower step than the current gear ratio step.

In the above-mentioned configuration, when making a decision of the current gear ratio step (gear ratio step of currently engaged gear) determined based on the actual gear ratio and gear ratio map, the determination means of gear ratio step is configured to halt to make the decision of current gear ratio step during activation or at completion time of the synchronizer when each of revolutions of the input and output shafts unsteadily fluctuates, by the first timer to halt making a decision of current gear ratio step for a predetermined time. Thereby the determination means of gear ratio step is prevented from erroneous detection of current gear ratio step. In the result, it becomes to be possible to preferably prevent on-off intermittent indication of the current gear ratio step and temporary indication of the intermediate gear ratio steps in merely passing.

Furthermore in a transmission according to the present invention, the determination means of gear ratio step includes a display means of gear ratio step for indicating a status of gear ratio step and is configured to make the display means of gear ratio step not to indicate any current gear ratio steps while the first timer is activated.

In the above-mentioned configuration, while the first timer is activated, i.e., during activation or at completion time of the synchronizer when each of revolutions of the input and output shafts unsteadily fluctuates, an indication of status of current gear ratio step is forbidden. Consequently, it never happens to give a driver unnatural sensation (feeling) by on-off intermittent indication of the current gear ratio step and temporary indication of the intermediate gear ratio steps.

Furthermore, in a transmission according to the present invention, the determination means of gear ratio step is configured to stop the first timer and reset measured time when the gear ratio deviates from the gear ratio variable allowance range of the next step.

In the above-mentioned configuration, although the twist vibration of drive train is large and each of revolutions of the input and output shafts is unstable, it becomes to be possible to preferably prevent on-off intermittent indication of the gear ratio step and accurately indicate the current gear ratio step.

Furthermore in a transmission according to the present invention, an activating time of the first timer is configured to become longer as gear ratio step goes from a step of high vehicle speed to other step of low vehicle speed.

As transmitted torque and gear torque are larger at ratio-step side of low vehicle speed than at ratio-step side of high vehicle speed, twist vibration and backlash are larger at ratio-step side of low vehicle speed immediately after gear ratio change than at ratio-step side of high vehicle speed. In the result, time length when revolution is unstable is longer at ratio-step side of low vehicle speed than at ratio-step side of high vehicle speed.

Therefore, in the above-mentioned configuration, the activating time of the first timer is configured to become longer as gear ratio step goes from a step of high vehicle speed to other step of low vehicle speed. In the result, it becomes to be possible to preferably prevent on-off intermittent indication of the current gear ratio step and temporary indication of the intermediate gear ratio steps in merely passing.

Furthermore in a transmission according to the present invention, the determination means of gear ratio step including a second timer for measuring a second given time, is configured to make the second timer get started at a time which is earlier when the detection means of neutral condition detects the neutral condition or when the gear ratio deviates from the gear ratio variable allowance range corresponding to the current gear ratio step; and to make the display means of gear ratio step to indicate a gear ratio step immediately before the second timer gets started while the second timer is activated.

In the above-mentioned configuration, by the second timer to make the display means of gear ratio step to keep on indicating a status of gear ratio step immediately before gear ratio change, is shorten an uncertain time (blank time) where a current gear ratio is not yet fixed at an early time of the gear ratio change. In the result, it becomes to be possible to prevent on-off intermittent indication of the current gear ratio step and temporary indication of the intermediate gear ratio steps in merely passing in the early time of the gear ratio change.

Furthermore in a transmission according to the present invention, the determination means of gear ratio step is configured to make the second timer get stopped when the first timer gets started.

In the above-mentioned configuration, the first timer is activated with priority over the second timer. In the result, it becomes to be possible to rapidly indicate a current gear ratio step after each of revolutions of the input and output shafts is stable.

Effect of the Invention

In a transmission according to the present invention, when making a decision of current gear ratio step (gear ratio step of currently engaged gear) determined based on actual gear ratio and gear ratio map, the determination means of gear ratio step is, by the first timer (delay timer) to halt making a decision of current gear ratio step for a predetermined time, configured to halt to make the decision of current gear ratio step, during activation or at completion time of the synchronizer when each of revolutions of the input and output shafts unsteadily fluctuates. Thereby the determination means of gear ratio step is prevented from erroneous detection of current gear ratio step. In the result, it becomes to be possible to preferably prevent on-off intermittent indication of the current gear ratio step and temporary indication of the intermediate gear ratio steps in merely passing.

Also, determination of current gear ratio is supposed to be conducted based on ratio of actual revolutions of the input and output shafts measured by the first and second detection means as well as gear ratio map for defining a gear ratio variable allowance range for each of gear ratio steps. In the result, it becomes to be possible to rapidly and accurately indicate a current gear ratio step regardless of engagement of clutch. Additionally, there are needed no position detection sensors for respective ratio steps but neutral position in process of determining a current gear ratio step, thereby it can be preferably expected to reduce product cost.

Moreover, the second timer to keep on indicating a status of gear ratio immediately before gear ratio change, makes shorten uncertain time (blank time) where a current gear ratio is not yet fixed at an early time of the gear ratio change and consequently, with the first timer, it becomes to be possible to more preferably prevent on-off intermittent indication of the current gear ratio step and temporary indication of the intermediate gear ratio steps in merely passing. In the result, a driver comes to feel nothing unnatural with respect to gear ratio change.

BRIEF DESCRIPTION OF THE DRAWING(S)

DETAILED DESCRIPTION

Embodiments of the present invention are hereinafter described in detail with reference to the attached drawings.

Figure 1:
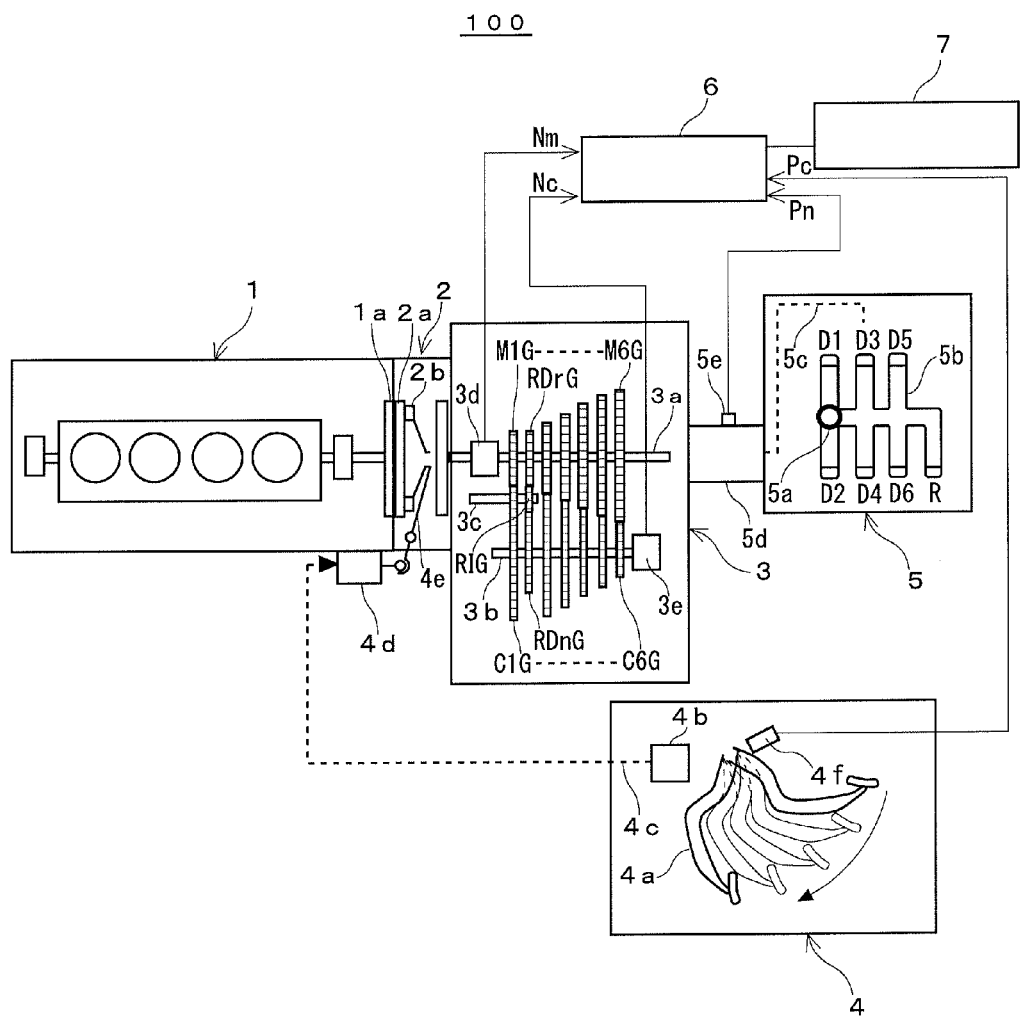
FIG. 1 is an explanation drawing to show a configuration of transmission system in accordance with an embodiment of the present invention.

FIG. 1 is an explanation drawing to show a configuration of transmission system in accordance with an embodiment of the present invention. It should be noted that, for convenience of explanation, a power source 1 including engine is also shown in the FIG. 1.

This transmission system 100 includes a clutch portion 2 which connects or disconnects a gear portion 3 and the power source 1 producing drive torque, the gear portion 3 which changes revolution of drive torque transferred from the power source 1, a clutch operation portion 4 for driver to operate the clutch portion 2, a shift operation portion 5 for driver to operate the gear portion 3, a determination apparatus of gear ratio step 6 (as actual gear ratio calculation means and determination means of gear ratio step) performing a prevention process against erroneous detection of gear ratio step in accordance with the present invention, and status display of gear ratio step 7 (as display means of gear ratio step) indicating a status of decided current gear ratio step. The prevention process against erroneous detection of gear ratio step is described below in detail with reference to FIGS. 2 to 6. Furthermore, each of elements is described below.

What is needed for the power source 1 applied to the present invention is to produce a rotational drive torque. Therefore, a mechanism of producing the rotational drive torque should not be especially limited. Internal combustion including gasoline-powered engine, electrical motor-powered engine or hybrid engine etc. can be preferably applied to the embodiment of the present invention.

The clutch portion 2 is a hydraulic clutch. A driver pushes a clutch pedal 4a downward to cause oil pressure in a clutch master cylinder 4b. The oil pressure propagates in a hydraulic pipe 4c and drives a clutch disk driving mechanism having a release cylinder 4d and a release fork 4e. Pushing force of a clutch cover 2b over a clutch disk 2a is released by driving force of the release cylinder 4d and fork 4e. In the result, the clutch disk 2a becomes to be separated from a flywheel 1a. Clutch pedal switch 4f is disposed near the clutch pedal 4a and outputs a signal every time driver pushes the clutch pedal 4a downward.

The gear portion 3 includes a main shaft 3a, a counter shaft 3b and a reverse idle shaft 3c. The main shaft 3a includes a gear set M1G to M6G respectively corresponding to 1st gear ratio position "D1" to 6th gear ratio position "D6" of shift operation portion 5 and a reverse drive gear RDrG corresponding to reverse gear position "R" of shift operation portion 5. Note that main 1st gear M1G, main 2nd gear M2G and reverse drive gear R are constantly connected for rotation with the main shaft 3a whereas a gear set M3G to M6 is selectively connectable for rotation with the main shaft 3a. On the other hand, the counter shaft 3b includes a gear set C1G to C6G respectively meshing with the gear set M1G to M6G and a reverse driven gear RDnG formed on a sleeve (not shown) of 1st-2nd synchronizer selectively engageable with the main 1st gear M1G or 2nd gear M2G. Note that counter 1st gear C1G and counter 2nd gear C2G are selectively connectable for rotation with the counter shaft 3b whereas a gear set C3G,C4G,C5G,C6G is constantly connected for rotation with the counter shaft 3b. The reverse idle shaft 3c includes a reverse idle gear RIG meshing with both the reverse drive gear RDrG and driven gear RDnG. The idle gear RIG is rotatably supported on the reverse idle shaft 3c.

Between the counter 1st gear C1G and 2nd gear C2G is provided 1st-2nd synchronizer (not shown) selectively connecting the counter 1st gear C1G or 2nd gear C2G to the counter shaft 3b for rotation therewith. Between the main 3rd gear M3G and 4th gear M4G is also provided 3rd-4th synchronizer (not shown) selectively connecting the 3rd gear M3G or main 4th gear M4G to the main shaft 3a for rotation therewith. Between the main 5th gear M5G and main 6th gear M6G is also provided 5th-6th synchronizer (not shown) selectively connecting the main 5th gear M5G or main 6th gear M6G to the main shaft 3a for rotation therewith.

For example, if the 1st-2nd synchronizer is engaged to connect the counter 1st gear C1G or 2nd gear C2G to the counter shaft 3b, 1st gear sequence or 2nd gear sequence is established. Also, if the 3rd-4th synchronizer is engaged to connect the main 3rd gear M3G or 4th gear M4G to the main shaft 3a, 3rd gear sequence or 4th gear sequence is established as well. Furthermore, if the 5th-6th synchronizer is engaged to connect the main 5th gear M5G or 6th gear M6G to the main shaft 3a, 5th gear sequence or 6th gear sequence is established as well. For a reverse gear sequence, if the reverse idle gear RIG is made move to a position to mesh with both the reverse drive gear RDrG and driven gear RDnG, then the reverse gear sequence can to be established. Each established gear sequence transfers drive torque with a given gear ratio from main shaft 3a to counter shaft 3b. The drive torque transferred to the counter shaft 3b is, in turn, transferred to a differential (not shown) through a final drive gear (not shown).

The main shaft 3a also includes a main revolution sensor 3d for detecting a revolution of the main shaft 3a. The revolution of the main shaft 3a may be retrieved from such a gear as main 1st gear M1G, main 2nd gears M2G or reverse drive gear RDrG for rotation synchronized with the main shaft 3a. In a same manner, the counter shaft 3b also includes a counter revolution sensor 3e for detecting a revolution of the counter shaft 3b. The revolution of the counter shaft 3b may be retrieved from such a gear as any one of counter 3rd to 6th gears C3G to C6G for rotation synchronized with the counter shaft 3b. Each of retrieved signals is used for performing a prevention process against erroneous detection of gear ratio step in accordance with an embodiment of the present invention as described below.

The shift operation portion 5 includes a change lever 5a, a gate portion 5b, a change wire 5c, and a link mechanism 5d for driving respective synchronizers of gear portion 3. As omitted in detail, the link mechanism 5d includes a shift arm (not shown) movable along and rotatable about a shaft, four shift forks (not shown) engaged with respective sleeves (not shown) of the synchronizers, four shift pieces engaged with both the shift arm and shift fork. The link mechanism 5d is configured to drive the shift arm move along the shaft to be engaged with one shift piece in response to motion of change lever 5a operated by driver, and in turn the shift arm rotate about the shaft to displace the shift piece in axial direction of the main shaft 3a or counter shaft 3b to drive a synchronizer. Also, in direction perpendicular to axial direction of shift arm is provided a neutral sensor 5e for directly detecting a neutral position of change lever 5a.

The determination apparatus of gear ratio step 6 determines a current gear ratio step by receiving respective signals Nm,Nc,Pn from the main and counter revolution sensors 3d,3e and neutral sensor 5e and performing a prevention process against erroneous detection of gear ratio step in accordance with an embodiment of the present invention as described below. Note that the determination apparatus of gear ratio step 6 may be in exclusive use instead of shearing use with engine control unit (ECU) as in the embodiment of the present invention.

The status display of gear ratio step 7 receives a command from the determination apparatus of gear ratio step 6 and indicate a current gear ratio step by LED light etc.

Figure 2:
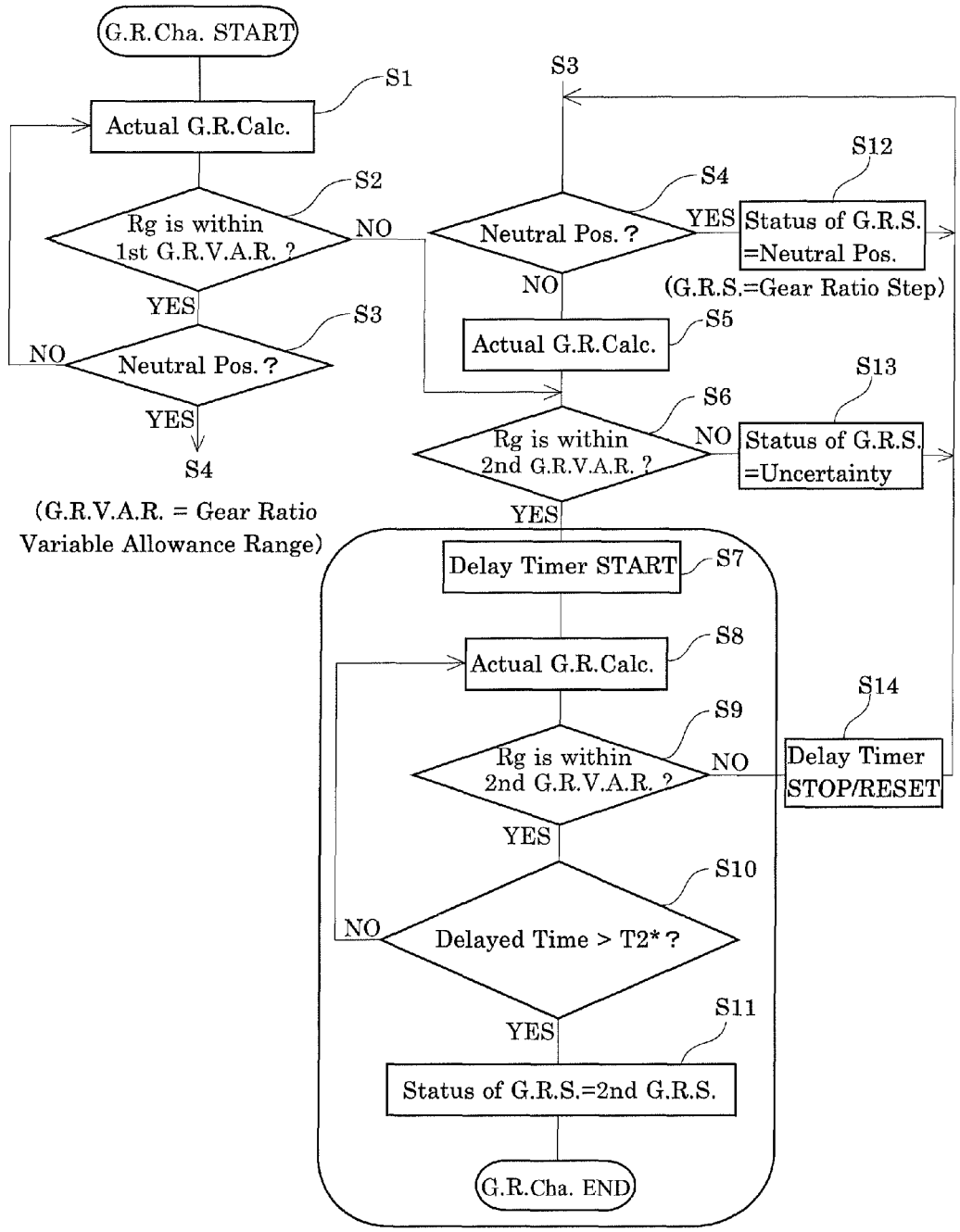
FIG. 2 is an example of flow chart of prevention process against erroneous detection of gear ratio step (without retention timer) in accordance with an embodiment of the present invention.

FIG. 2 is an example of flow chart of prevention process against erroneous detection of gear ratio step (without retention timer) in accordance with an embodiment of the present invention. Herein is described a flow chart of upshift from 1st gear ratio step to 2nd gear ratio step.

Figure 3:
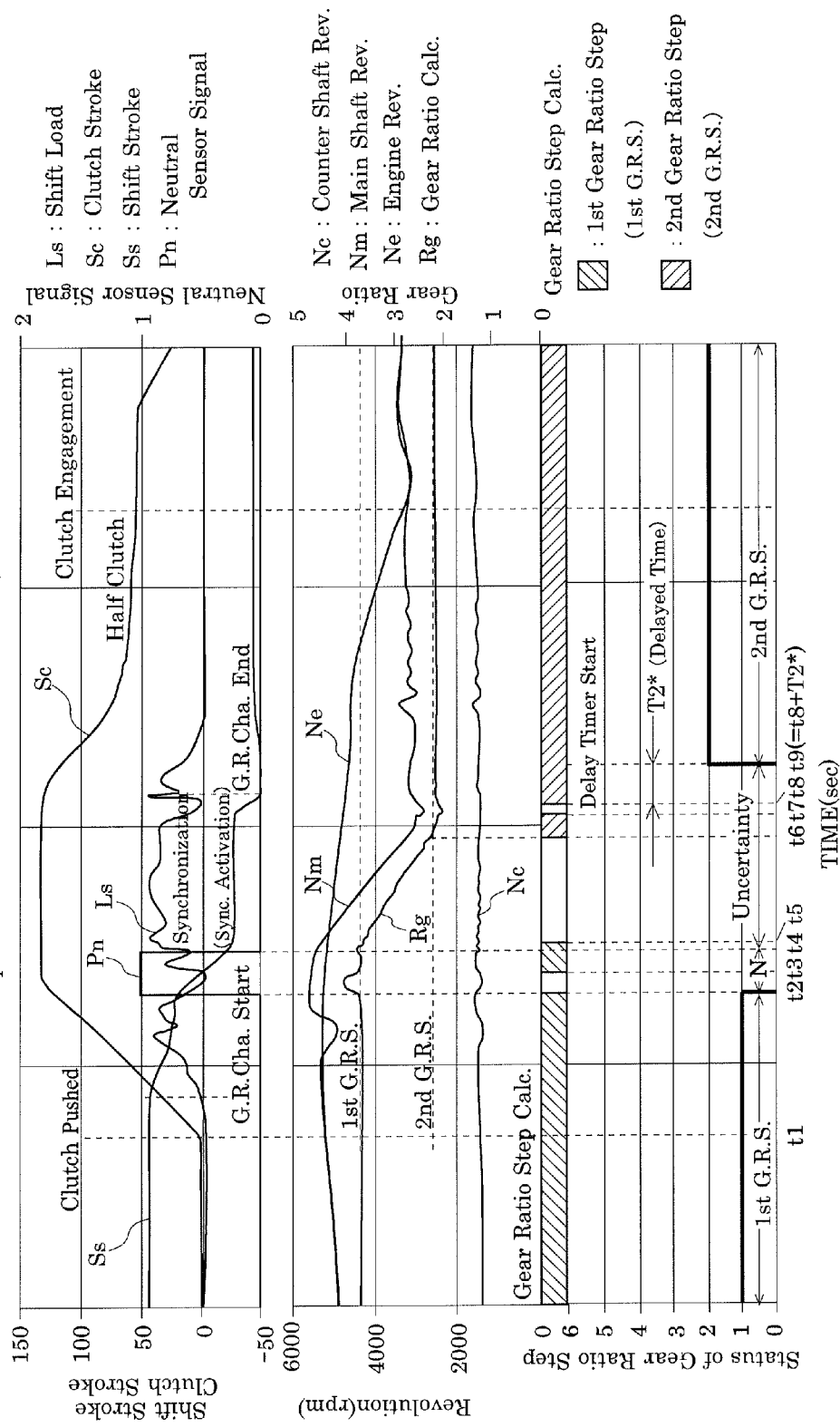
FIG. 3 is an explanation drawing to show each of time charts regarding such as neutral sensor signal, gear ratio calculation of counter shaft and main shaft revolutions, and status of gear ratio step in association with the prevention process against erroneous detection of gear ratio step as in FIG. 2.

In step S1, the determination apparatus of gear ratio step 6 firstly calculates an actual gear ratio of current gear ratio step. The actual gear ratio is obtained by calculating ratio of signal Nm corresponding to revolution of main shaft 3a sent from main revolution sensor 3d and signal Nc corresponding to revolution of counter shaft 3b sent from counter revolution sensor 3e. Note that the calculation result is stored as a gear ratio calculation Rg (as seen in FIG. 3) in the determination apparatus of gear ratio step 6.

Figure 5:
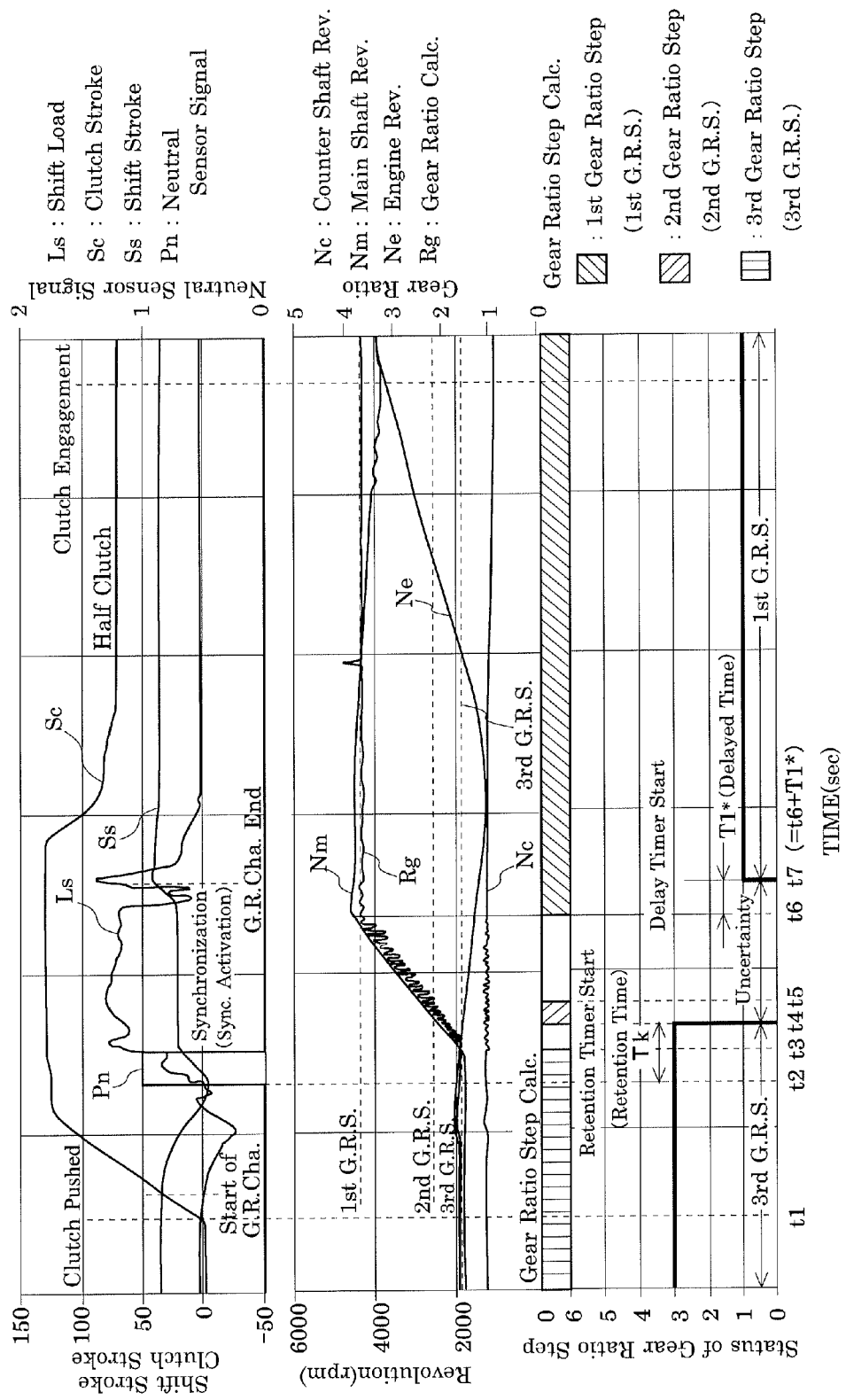
FIG. 5 is an explanation drawing to show each of time charts regarding such as neutral sensor signal, gear ratio calculation of counter shaft and main shaft revolutions, and status of gear ratio step in association with the prevention process against erroneous detection of gear ratio step as in FIG. 4.
Figure 6:
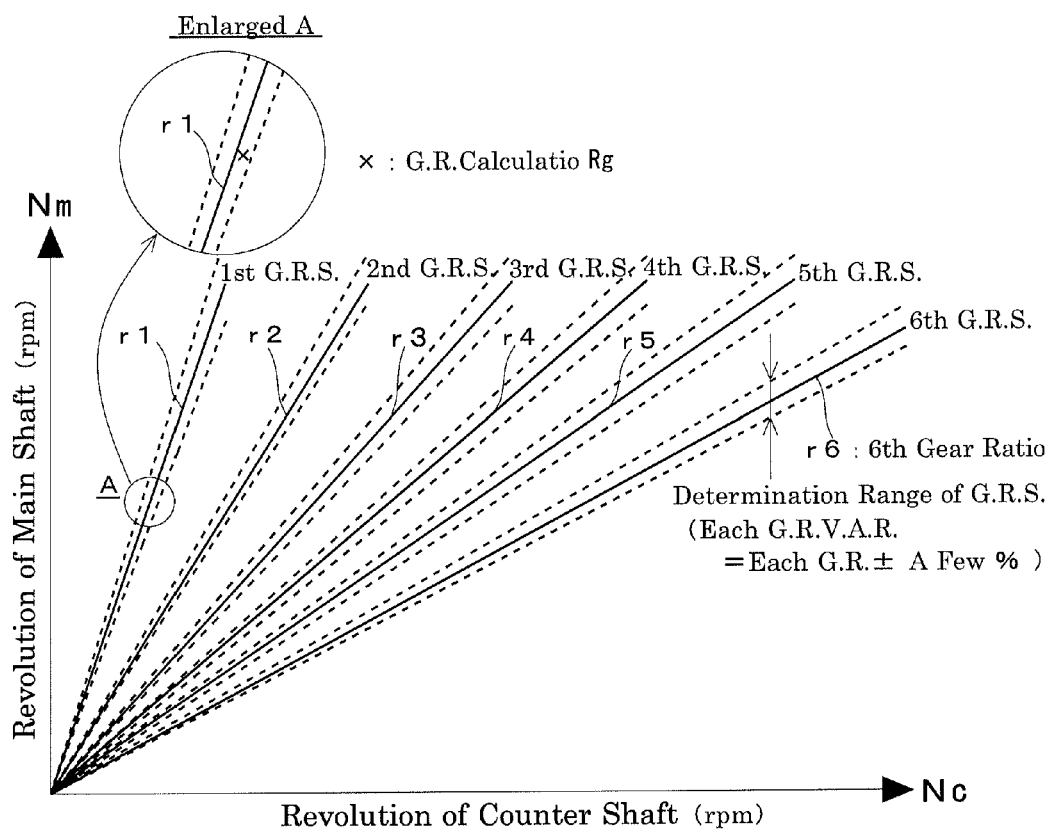
FIG. 6 is an explanatory drawing to show gear ratio map in accordance with an embodiment of the present invention.

In step S2, the determination apparatus of gear ratio step 6 determines whether or not the gear ratio calculation Rg is within gear ratio variable allowance range of 1st gear ratio step. The "gear ratio variable allowance range" as used herein is defined as a range that is sandwiched by two dot-lines respectively disposed above or below from gear ratio of respective gear ratio steps in the gear ratio map as shown in FIG. 6. Also, Note that the "determination" as used herein means to determine whether or not a calculated gear ratio calculation Rg is within the gear ratio variable allowance range as shown in FIG. 6, and the result of the determination is stored as "gear ratio step calculation" (as seen in FIG. 3 or FIG. 5) in the determination apparatus of gear ratio step 6. In this case, if the gear ratio calculation Rg calculated in the step S1 is within the gear ratio variable allowance range of 1st gear ratio step (YES), the determination apparatus of gear ratio step goes to step S3. On the other hand, if the gear ratio calculation Rg deviates from the gear ratio variable allowance range of 1st gear ratio step (NO), the determination apparatus of gear ratio step 6 goes to step S6.

In step S3, the determination apparatus of gear ratio step 6 determines whether or not a current gear ratio step is neutral position. Note that the "neutral position" as used herein is defined as a position where any drive gears are not connected for rotation with input shaft 3a or output shaft 3b by synchronizers (so-called "disengaged position"). The neutral position is detected based on the neutral sensor signal Pn transmitted from the neutral sensor 5e. Therefore, if receiving an on-signal of the neutral sensor signal Pn, the determination apparatus of gear ratio step 6 determines a current gear ratio step as neutral position (YES) and goes to step S4 to redetermine whether or not a current gear ratio step is neutral position. On the other hand, if not receiving an on-signal of the neutral sensor signal Pn, the determination apparatus of gear ratio step 6 determines a current gear ratio step as not a neutral position (NO) and returns to step S1 to recalculate a gear ratio calculation Rg to be an actual gear ratio of current gear ratio step.

In step S4 as well as step S3, the determination apparatus of gear ratio step 6 determines whether or not a current gear ratio step is neutral position. If determining a current gear ratio step as neutral position (YES), the determination apparatus of gear ratio step 6 makes a decision that a current gear ratio step is neutral position and goes to step S12 to make the status display of gear ratio step 7 to indicate nothing. Note that the "decision" as used herein means that such a controller as determination apparatus of gear ratio step 6 has recognized a current gear ratio step as a status of gear ratio step (data) and a decided status of gear ratio is stored in the controller. Then, returning to the step S4, the determination apparatus of gear ratio step 6 performs the same process again. On the other hand, if determining a current gear ratio step as not a neutral position (NO), the determination apparatus of gear ratio step 6 goes to step S5 to calculate an actual gear ratio (gear ratio calculation Rg) of current gear ratio step.

In step S6, the determination apparatus of gear ratio step 6 determines whether or not the gear ratio calculation Rg is within gear ratio variable allowance range of 2nd gear ratio step to be next step. If the gear ratio calculation Rg calculated in the step S5 is within the gear ratio variable allowance range of 2nd gear ratio step (YES) as shown in FIG. 6, the determination apparatus of gear ratio step 6 goes to step S7 to make a delay timer get started. Note that delayed objective is a decision of current gear ratio step (current gear ratio position). It should be also understood that the "current gear ratio step (current gear ratio position)" as used hereinbefore and hereinafter means a gear ratio step (gear ratio position) determined that a calculated gear ratio calculation Rg is within the gear ratio variable allowance range of the gear ratio step as shown in FIG. 6.

On the other hand, if the gear ratio calculation Rg deviates from the gear ratio variable allowance range of 2nd gear ratio step (NO), the determination apparatus of gear ratio step 6 is supposed to make a decision that a status of current gear ratio step is in uncertainty, and therefore goes to step S13 to make the status display of gear ratio step 7 to indicate nothing. Then, the determination apparatus of gear ratio step 6 returns to the step S4 to perform the same process again.

In step S8 as well as steps S1 and S5, the determination apparatus of gear ratio step 6 calculates a gear ratio calculation Rg to be an actual gear ratio of current gear ratio step.

In step S9 as step S6, the determination apparatus of gear ratio step 6 determines whether or not the gear ratio calculation Rg calculated in step S8 is within gear ratio variable allowance range of 2nd gear ratio step. If the gear ratio calculation Rg calculated in the step S8 is within the gear ratio variable allowance range of 2nd gear ratio step (YES), the determination apparatus of gear ratio step 6 goes to step S10. On the other hand, if the gear ratio calculation Rg deviates from the gear ratio variable allowance range of 2nd gear ratio step (NO), the determination apparatus of gear ratio step 6 cannot make a decision of a status of current gear ratio step, and therefore goes to step S14 to make the delay timer get stopped and delayed time reset to zero. Then, returning to the step S4 again, the determination apparatus of gear ratio step 6 determines whether or not a current gear ratio step is neutral position. Note that the delay timer gets restarted from zero when the determination apparatus of gear ratio step 6 makes the delay timer get started in step S7 via steps S4 to S6, again.

In step S10, the determination apparatus of gear ratio step 6 determines whether or not delayed time (elapsed time after the delay timer gets started) exceeds a predetermined time T2*. If the determination apparatus of gear ratio step 6 determines that the delayed time exceeds the predetermined time T2* (YES), the determination apparatus of gear ratio step 6 makes a decision of status of current gear ratio step and goes to step S11 to make the status display of gear ratio step 7 to indicate "2" which means 2nd gear ratio step, thereby allows process of the above-mentioned flow chart to be terminated. On the other hand, if determining that the delayed time does not exceed the predetermined time T2* (NO), the determination apparatus of gear ratio step 6 repeatedly performs calculation process of actual gear ratio in step S8 and determination process of current gear ratio step until the delayed time exceeds the predetermined time T2*, then going to step S11 to make the status display of gear ratio step 7 to indicate "2" which means 2nd gear ratio step, thereby allows process of the above-mentioned flow chart to be terminated as well.

Note that length of predetermined time of delay timer is changed for each of gear ratio steps, that is, the predetermined time T1* of 1st gear ratio step has maximum length among all determined time, and afterward, the predetermined time T2* of 2nd gear ratio step has larger length than the predetermined time T3* of 3rd gear ratio that has larger length than the predetermined time T4* of the 4th gear ratio step that has larger length than the predetermine time T5* of the 5th gear ratio step that has length of predetermined time T6* of 6th gear ratio step, as T1*>T2*>T3*>T4*>T5*>T6*. It is because transfer torque and gear moment are larger in gear ratio step with respect to low vehicle speed than in gear ratio step with respect to high vehicle speed.

FIG. 3 is an explanation drawing to show each of time charts regarding neutral sensor signal Pn, gear ratio calculation Rg of counter shaft revolution Nc and main shaft revolution Nm, and status of gear ratio step etc in association with the prevention process against erroneous detection of gear ratio step (without retention timer) as in FIG. 2. For reference is also shown each of time charts of shift load Ls, clutch stroke Sc, shift stroke Ss and engine revolution Ne. Note that the "gear ratio step calculation" as used in FIG. 3 is a index of status of current gear ratio step (1st, 2nd, . . . ) obtained by discrete processing of gear ratio calculation based on the gear ratio map.

At time of t1 when clutch pedal is pushed down, the process of FIG. 2 starts. The determination apparatus of gear ratio step 6 respectively performs gear ratio calculation Rg and gear ratio step calculation, as taking in signals of counter shaft revolution Nc and main shaft revolution Nm. These processes correspond to steps S1 and S2 of FIG. 2, respectively.

At time of t2 when the neutral sensor signal Pn turns out ON level, indication of status of gear ratio step (the status display of gear ratio step 7) changes from "1" to a blank meaning neutral position. From the time of t2 to the time of t4, the status of gear ratio step keeps on indicating the blank meaning neutral position. On the other hand, according to indication of gear ratio step calculation from the time of t3 to the time of t5, a current gear ratio step is determined as 1st gear ratio step (1st G.R.S.). That is, the indication of status of gear ratio step is different from the indication of gear ratio step calculation from the time of t3 to the time of t5. It is because, with respect to indication of neutral position, indication of status of gear ratio step is made based on neutral sensor signal Pn whereas indication of gear ratio step calculation is made based on gear ration calculation Rg to be a actual gear ratio of main shaft revolution Nm and counter shaft revolution Nc. As clearly understood in each of time-charts, main shaft revolution Nm and counter shaft revolution Nc are both not stable due to twist vibration and backlash generating in drive train at initial time of gear ratio change. Therefore, in the prevention process against erroneous detection of gear ratio step in accordance with the present invention, signal of neutral sensor 5e has priority over gear ratio calculation Rg with respect to determination of neutral position, thereby it becomes to be possible to accurately determine the neutral position and to accurately indicate the neutral position in the status of gear ratio step. This determination of neutral position corresponds to processes of steps where S3 goes to S4 to go to S12 to return to S4 to go likewise as in FIG. 2.

At the time of t4, the neutral sensor signal Pn turns out an OFF level. After the time of t4, the determination apparatus of gear ratio step 6 determines status of current gear ratio step based on gear ratio calculation Rg (gear ratio step calculation). Especially, as the gear ratio step calculation is still unchangeably 1st gear ratio step during the time from t4 to t5, the determination apparatus of gear ratio step 6 determines current gear ratio step does not yet reach next gear ratio step (2nd gear ratio step in this case) and consequently makes a decision of current gear ratio step to be in uncertainty, consequently making nothing indicated in the status of gear ratio step. These determination and decision processes of uncertainty correspond to processes of steps where S5 goes to S6 to go to S13 to go likewise as in FIG. 2.

At the time of t5, gear ratio calculation Rg deviates from gear ratio variable allowance range of 1st gear ratio step (range sandwiched by two dotted lines in FIG. 6). After the time of t5, the determination apparatus of gear ratio step 6 also determines current gear ratio step does not yet reach 2nd gear ratio step and consequently makes a decision of current gear ratio step to be in uncertainty, consequently making nothing indicated in the status of gear ratio step. These determination and decision processes of uncertainty also correspond to processes of steps where S4 goes to S5 to go to S6 to go to S13 to go likewise as in FIG. 2.

At the time of t6, gear ratio calculation Rg goes within gear ratio variable allowance range of 2nd gear ratio step and then, the determination apparatus of gear ratio step 6 makes a delay timer get started and begins to measure a delayed time. But, at the time of t7, as gear ratio step calculation deviates from the gear ratio variable allowance range of 2nd gear ratio step, the delay timer is made get stopped and delayed time reset at the same time. Therefore, from the time of t6 to the time of t7, the determination apparatus of gear ratio step 6 determines current gear ratio step does not yet reach 2nd gear ratio step and consequently makes a decision of current gear ratio step to be in uncertainty, making nothing indicated in the status of gear ratio step. As described above, even if gear ratio calculation Rg is within gear ratio variable allowance range of next step and the delay timer gets started, the delay timer is made get stopped and delayed time reset when the gear ratio calculation Rg deviates from the gear ratio variable allowance range. These determination and decision processes of uncertainty correspond to processes of steps where S6 goes to S7 to go to S8 to go to S9 to go to S14 to return to S4 to go to S5 to go to S6 to go to S13 to go likewise as in FIG. 2.

At the time of t8, gear ratio calculation Rg again goes within gear ratio variable allowance range of 2nd gear ratio step and then, the determination apparatus of gear ratio step 6 again makes delay timer get started and begins to measure a delayed time. The delay timer is activated for only a predetermined time T2*, i.e., from the time of t8 to the time of t9 (=t8+T2*). While the delay timer is activated, the determination apparatus of gear ratio step 6 halts to make a decision of status of gear ratio step with determining whether or not current gear ratio step is within the corresponding gear ratio variable allowance range, making nothing indicated in the status of gear ratio step. These determination and decision processes of uncertainty correspond to processes of steps where S7 goes to S8 to go to S9 to go to S10 to return to S8 to go likewise as in FIG. 2.

At the time of t9, the delay timer gets terminated and then, the determination apparatus of gear ratio step 6 makes a decision of status of current gear ratio step with referring to result of the gear ratio step calculation, making the status of gear ratio step to indicate "2" meaning 2nd gear ratio step.

As described above, in the prevention process against erroneous detection of gear ratio step, when making a decision of current gear ratio step (gear ratio step of currently engaged gear) determined on the basis of gear ratio calculation Rg and gear ratio map, the determination apparatus of gear ratio step 6 is, by the delay timer to halt making a decision of current gear ratio step for a predetermined time, configured to halt to make the decision of current gear ratio step during activation or at completion time of the synchronizer when each of revolutions of the input and output shafts unsteadily fluctuates. Thereby the determination apparatus of gear ratio step 6 is prevented from erroneous detection of current gear ratio step. In the result, it becomes to be possible to preferably prevent on-off intermittent indication of the current gear ratio step and temporary indication of the intermediate gear ratio steps in merely passing.

A calculation of actual gear ratio (gear ratio calculation Rg) as used in determining current gear ratio step, is conducted based on each of revolutions Nm,Nc of main shaft 3a and counter shaft 3b, and consequently it becomes to be possible to accurately determine the current gear ratio step regardless of clutch engagement.

Furthermore, in order to determine current gear ratio step, no sensor is needed but main revolution sensor 3d, counter revolution sensor 3e and neutral sensor 5e. In the result, it becomes to be possible to make product cost considerably reduced.

As described below, the prevention process against erroneous detection of gear ratio step, in addition to the delay timer, includes a retention timer to keep on indicating status of gear ratio step immediately before change of gear ratio step for a predetermined time.

Figure 4:
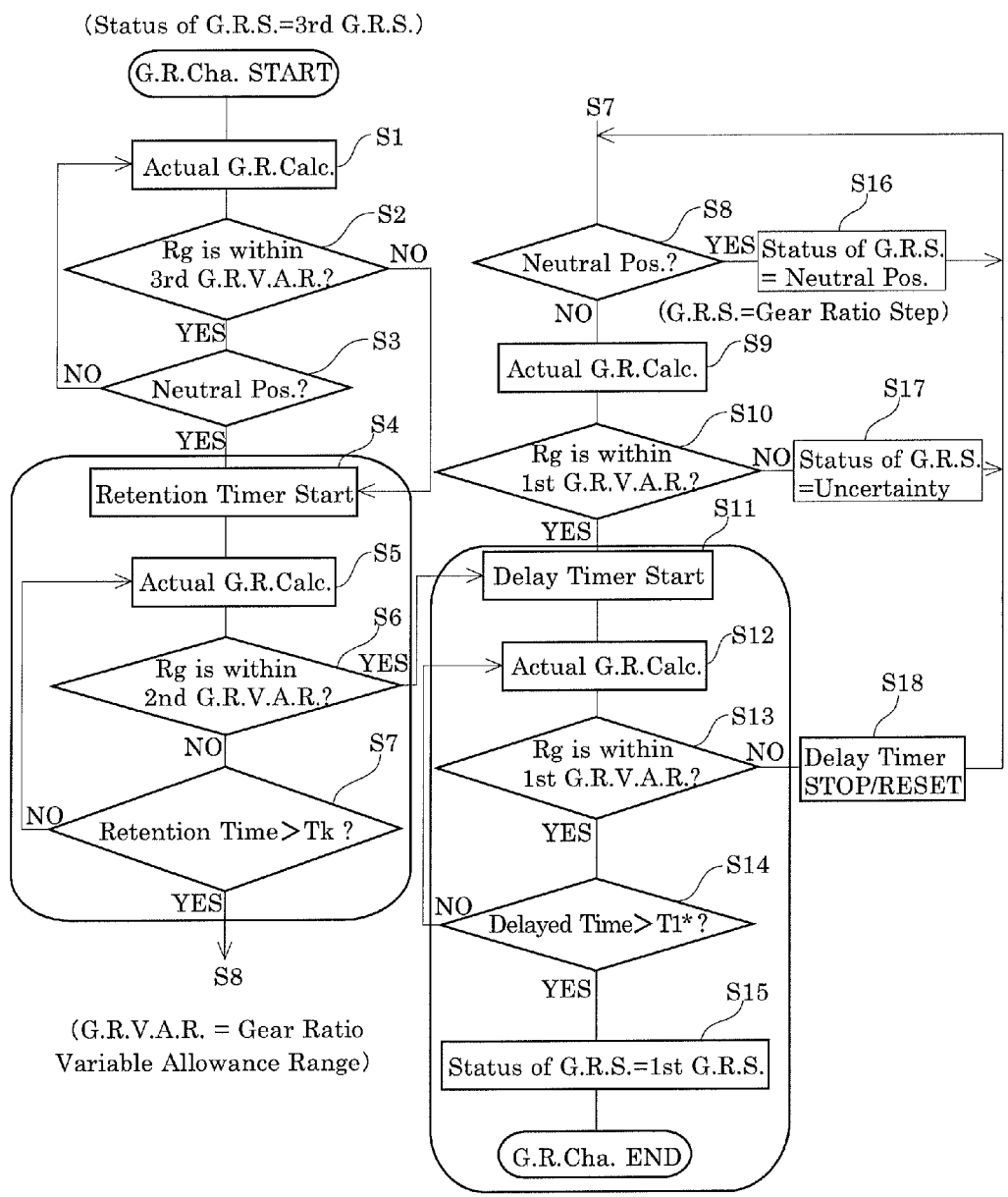
FIG. 4 is an example of flow chart of prevention process against erroneous detection of gear ratio step (with retention timer) in accordance with another embodiment of the present invention.

FIG. 4 is an example of flow chart of prevention process against erroneous detection of gear ratio step (with retention timer) in accordance with another embodiment of the present invention. Note that hereinafter is described a flow chart of jumping downshift from 3rd gear ratio step to 1st gear ratio step.

In step S1, the determination apparatus of gear ratio step 6 firstly calculates an actual gear ratio of current gear ratio step. The actual gear ratio is obtained by calculating ratio of signals Nm,Nc corresponding to revolutions of main and counter shafts 3a,3b sent from main and counter revolution sensors 3d,3e, respectively. Note that the calculation result is stored as a gear ratio calculation Rg (FIG. 5) in the determination apparatus of gear ratio step 6.

In step S2, the determination apparatus of gear ratio step 6 determines whether or not the gear ratio calculation Rg is within gear ratio variable allowance range of 3rd gear ratio step. In this case, if the gear ratio calculation Rg calculated in the step S1 is within the gear ratio variable allowance range of 3rd gear ratio step (YES), the determination apparatus of gear ratio step goes to step S3. On the other hand, if the gear ratio calculation Rg deviates from the gear ratio variable allowance range of 3rd gear ratio step (NO), the determination apparatus of gear ratio step 6 goes to step S4 to make the retention timer get started.

In step S3, the determination apparatus of gear ratio step 6 determines whether or not a current gear ratio step is neutral position. In this case, if receiving on-signal of neutral sensor signal Pn, the determination apparatus of gear ratio step 6 determines a current gear ratio step as a neutral position (YES) and goes to step S4 to make the retention timer get started. On the other hand, if not receiving on-signal of neutral sensor signal Pn, the determination apparatus of gear ratio step 6 determines a current gear ratio step as not a neutral position (NO) and returns to step S1 to recalculate a gear ratio calculation Rg to be an actual gear ratio of current gear ratio step.

As described above, the determination apparatus of gear ratio step 6 makes the retention timer get started at the time which is earlier when gear ratio calculation Rg deviates from gear ratio variable allowance range corresponding to current gear ratio step or when the determination apparatus of gear ratio step 6 receives on-signal of neutral sensor signal Pn.

In step S4, the determination apparatus of gear ratio step 6 makes the retention timer get started (begins to measure a retention time). During activation of the retention timer, the determination apparatus of gear ratio step 6 makes indicate a status of gear ratio step immediately before the retention timer gets started. Note that the determination apparatus of gear ratio step 6 may make indicate nothing instead of indicating a status of gear ratio step immediately before the retention timer gets started.

In step S5 as well as steps S1, the determination apparatus of gear ratio step 6 calculates a gear ratio calculation Rg to be an actual gear ratio of current gear ratio step.

In step S6, the determination apparatus of gear ratio step 6 determines whether or not the gear ratio calculation Rg is within gear ratio variable allowance range of 2nd gear ratio step to be next step. If the gear ratio calculation Rg is, as in step S2, within the gear ratio variable allowance range of 2nd gear ratio step (YES) as shown in FIG. 6, the determination apparatus of gear ratio step 6 goes to step S11 to make a delay timer get started. On the other hand, if the gear ratio calculation Rg deviates within the gear ratio variable allowance range of 2nd gear ratio step (NO) as shown in FIG. 6, the determination apparatus of gear ratio step 6 goes to step S7. As described above, even if the retention timer is being activated, when receiving a trigger signal of delay timer (signal where gear ratio calculation Rg goes within gear ratio variable allowance range to be next step), the determination apparatus of gear ratio step 6 makes the retention timer get stopped and the delay timer get started. That is, the delay timer is processed with priority over retention timer in the prevention process against erroneous detection of gear ratio step in accordance with the present invention.

In step S7, the determination apparatus of gear ratio step 6 determines whether or not the retention time (elapsed time after the retention timer gets started) exceeds a predetermined time Tk. If the determination apparatus of gear ratio step 6 determines that the retention time exceeds the predetermined time Tk (YES), the determination apparatus of gear ratio step 6 goes to step S8. On the other hand, if determining that the retention time does not exceed the predetermined time Tk (NO), the determination apparatus of gear ratio step 6 returns to step S5 to calculate a gear ratio calculation Rg to be a actual gear ratio of current gear ratio step.

In step S8, the determination apparatus of gear ratio step 6 determines whether or not a current gear ratio step is neutral position. If determining that a current gear ratio step is neutral position (YES), the determination apparatus of gear ratio step 6 makes a decision of a status of current gear ratio step as neutral position and goes to step S16 to make status display of gear ratio step 7 to indicate nothing, returning to step S8 and perform the same process again. On the other hand, if determining a current gear ratio step as not a neutral position (NO) and goes to step S9 to recalculate a gear ratio calculation Rg to be an actual gear ratio of current gear ratio step as well as in steps S1 and S5.

In step S10, the determination apparatus of gear ratio step 6 determines whether or not a gear ratio calculation Rg is within gear ratio variable allowance range of the 1st gear ratio step to be next step. If the gear ratio calculation Rg calculated in step S9 is within the gear ratio variable allowance range of 1st gear ratio step (YES), the determination apparatus of gear ratio step 6 goes to step S11 to make a delay timer get started. On the other hand, if the gear ratio calculation Rg deviates within the gear ratio variable allowance range of 1st gear ratio step (NO), the determination apparatus of gear ratio step 6 determines a current gear ratio step does not yet reach 1st gear ratio step and consequently makes a decision of the current gear ratio step to be in uncertainty, going to step S17 and making status display of gear ratio step 7 to indicate nothing. Then, the determination apparatus of gear ratio step 6 returns to step S8 and performs the same process again.

In step S12 as well as steps S1, S5 and S9, the determination apparatus of gear ratio step 6 calculates a gear ratio calculation Rg to be an actual gear ratio of current gear ratio step.

In step S13 as well as step 10, the determination apparatus of gear ratio step 6 determines whether or not a gear ratio calculation Rg is within gear ratio variable allowance range of the 1st gear ratio step to be next step. If gear ratio calculation Rg calculated in step S12 is within gear ratio variable allowance range of the 1st gear ratio step (YES) as shown in FIG. 6, the determination apparatus of gear ratio step 6 goes to step S14. On the other hand, if the gear ratio calculation Rg deviates from gear ratio variable allowance range of the 1st gear ratio as shown in FIG. 6 (NO), the determination apparatus of gear ratio step 6, as status of gear ratio step is not yet decided, goes to step S18 to make the delay timer get stopped and reset to zero with respect to time-length. Then, the determination apparatus of gear ratio step 6 returns to step S8 again to determine whether or not current gear ratio step is neutral position. Note that the determination apparatus of gear ratio step 6 makes the delay timer restart from zero when making the delay timer get started in step S10 that follows after steps S8 and S9, in turn.

In step S14, the determination apparatus of gear ratio step 6 determines whether or not the delayed time (elapsed time after the delay timer get started) exceeds a predetermined time T1*. If the determination apparatus of gear ratio step 6 determines that the delayed time exceeds the predetermined time T1*(YES), the determination apparatus of gear ratio step 6 determines that current gear ratio step has reached the 1st gear ratio, and then goes to S15 to make the status display of gear ratio step 7 to indicate "1" meaning 1st gear ratio step, afterward terminating the process. On the other hand, if determining that the delayed time does not exceed the predetermined time T1*(NO), the determination apparatus of gear ratio step 6 repeatedly performs calculation process of actual gear ratio (in step S12) and determination process of current gear ratio (in step S13) step until the delayed time exceeds the predetermined time T1*, then going to step S15 to make the status display of gear ratio step 7 to indicate "1" which means 1st gear ratio step, afterward terminating the process as well.

FIG. 5 is an explanation drawing to show each of time charts regarding neutral sensor signal Pn, gear ratio calculation Rg of counter shaft revolution Nc and main shaft revolution Nm, and status of gear ratio step etc in association with the prevention process against erroneous detection of gear ratio step (with retention timer) as in FIG. 4. For reference is also shown each of time charts of shift load Ls, clutch stroke Sc, shift stroke Ss and engine revolution Ne. Note that the "gear ratio step calculation" as used in FIG. 5 is a index of status of current gear ratio step (1st, 2nd, . . . ) obtained by discrete processing of gear ratio calculation Rg based on the gear ratio map.

At time of t1 when clutch pedal is pushed down, the process of FIG. 4 starts. The determination apparatus of gear ratio step 6 respectively performs gear ratio calculation Rg and gear ratio step calculation, with taking in signals of counter shaft revolution Nc and main shaft revolution Nm. These processes correspond to, for example, steps S1 and S2 of FIG. 4.

At time of t2 when neutral sensor signal Pn turns out ON level, the determination apparatus of gear ratio step 6 makes a retention timer get started (begins to measure a retention time). During activation of the retention timer, the determination apparatus of gear ratio step 6 makes the status display of gear ratio step 7 to indicate a status of gear ratio step immediately before receiving the ON level of neutral sensor signal Pn. In this case, the status of gear ratio step immediately before receiving the ON level is 3rd gear ratio step and the determination apparatus of gear ratio step 6 makes the status display of gear ratio step 7 to indicate "3" meaning 3rd gear ratio step (3rd G.R.S.). It should be understood that At the time of t4, as gear ratio calculation Rg goes within gear ratio variable allowance range of 2nd gear ratio step to be next step, the determination apparatus of gear ratio step 6 makes the retention timer get stopped and a delay timer get started instead. These processes correspond to steps where S4 goes to S5 to go to S6 to go to S11 in FIG. 2.

But at the time of t5, gear ratio calculation Rg (actual gear ratio) deviates from gear ratio variable allowance range of 2nd gear ratio step and the determination apparatus of gear ratio 6 step makes the delay timer get stopped and delayed time reset to zero. In the result, the delayed get stopped in the middle of predetermined time T2*. By the time of t6 after the time of t5, as gear ratio calculation Rg is not within gear ratio variable allowance range of 1st gear ratio step to be next step, the determination apparatus of gear ratio step 6 cannot make a decision of status of gear ratio step and consequently makes the status display of gear ratio step 7 to indicate nothing without indicating "2" meaning 2nd gear ratio step. That is, in jumping downshift from 3rd to 1st gear ratio steps, 2nd gear ratio step to be intermediate gear ratio step in merely passing is never erroneously detected as a status of gear ratio step by the determination apparatus of gear ratio step 6. These processes correspond to steps where S12 goes to S13 to go to S18 in FIG. 4.

At the time of t6, gear ratio calculation Rg goes within gear ratio variable allowance range of 1st gear ratio step and then, the determination apparatus of gear ratio step 6 makes the delay timer get started and begins to measure a delayed time. The delay timer is activated for only a predetermined time T1*, i.e., from the time of t6 to the time of t7 (=t6+T1*). While the delay timer is activated, the determination apparatus of gear ratio step 6 halts to make a decision of status of gear ratio step with determining whether or not current gear ratio step is within the corresponding gear ratio variable allowance range, making nothing indicated in the status of gear ratio step. In the result, from the time of t6 to the time of t7, 1st gear ratio step is determined in the gear ratio step calculation whereas status of gear ratio step is not decided due to uncertainty. These processes correspond to steps where S9 goes to S10 to go to S11 to go to S12 to go to S13 to go likewise as in FIG. 4.

At the time of t7, the delay timer gets stopped and then, the determination apparatus of gear ratio step 6 makes a decision of status of current gear ratio step with referring to result of the gear ratio step calculation, making the status of gear ratio step to indicate "1" meaning 1st gear ratio step (1st G.R.S.).

As described above, in the prevention process against erroneous detection of gear ratio step, when making a decision of current gear ratio step (gear ratio step of currently engaged gear) determined on the basis of gear ratio calculation Rg and gear ratio map, the determination apparatus of gear ratio step 6 is, by the delay timer to halt making a decision of current gear ratio step for a predetermined time, configured to halt to make the decision of current gear ratio step during activation or at completion time of the synchronizer when each of revolutions of the input and output shafts unsteadily fluctuates. Thereby the determination apparatus of gear ratio step 6 is prevented from erroneous detection of current gear ratio step. In the result, it becomes to be possible to preferably prevent on-off intermittent indication of the current gear ratio step and temporary indication of the intermediate gear ratio steps in merely passing.

A calculation of actual gear ratio (gear ratio calculation Rg) as used in determining current gear ratio step, is conducted based on each of revolutions Nm,Nc of main shaft 3a and counter shaft 3b, and consequently it becomes to be possible to accurately determine the current gear ratio step regardless of clutch engagement.

Furthermore, in order to determine current gear ratio step, no sensor is needed but main revolution sensor 3d, counter revolution sensor 3e and neutral sensor 5e. In the result, it becomes to be possible to make product cost considerably reduced.

Moreover, a retention timer to keep on indicating a status of gear ratio immediately before change of gear ratio step, makes blank indication to be shorten in status of gear ratio step and consequently it becomes to be possible to more preferably prevent on-off intermittent indication of the current gear ratio step and temporary indication of the intermediate gear ratio steps in merely passing. In the result, a driver comes to feel nothing unnatural with respect to gear ratio change.

What is claimed is:

1. A transmission comprising:
   an input shaft receiving a drive torque transferred via a clutch from a power source;
   a synchronizer group having a plurality of synchronizers to select one of plural gear sequences;
   an output shaft transmitting the drive torque changed by the selected gear sequence to a final drive gear;
   a gear ratio calculation means for calculating an actual gear ratio based on revolutions of the input shaft and the output shaft detected by a main revolution sensor and a counter revolution sensor, respectively;
   a gear ratio map for defining a gear ratio variable allowance range for the gear ratio;
   a determination means of gear ratio for determining a current gear ratio by the actual gear ratio and the gear ratio variable allowance range; and
   a neutral sensor for detecting a neutral condition of the gear ratio,
   wherein the determination means of gear ratio is configured to start a first timer for measuring a first given time and to decide the current gear ratio before the first timer is halted, wherein the first timer is halted when the actual gear ratio reaches another gear ratio variable allowance range of a next step corresponding to one upper step or one lower step relative to the current gear ratio, and
   wherein the determination means of gear ratio is configured to start a second timer, after the first timer is halted, for measuring a second given time to decide whether the current gear ratio corresponds to another one upper step or another one lower step before the second timer is halted, wherein the second timer is shorter in length than the first timer.

2. The transmission according to claim 1, wherein the determination means of gear ratio comprises a display means for indicating a status of gear ratio and is configured to make the display means not to indicate any current gear ratio steps while the first timer is activated.

3. The transmission according to claim 2, wherein the determination means of gear ratio is configured to stop the first timer and reset the measured given first time when the gear ratio deviates from the another gear ratio variable allowance range of the next step.

4. The transmission according to claim 2, wherein the measured first given time of the first timer is configured to become longer the gear ratio goes from a step of high vehicle speed to another step of low vehicle speed.

5. The transmission according to claim 2, wherein the determination means of gear ratio is configured to start the second timer for measuring the second given time at an earlier of a time when the neutral sensor detects the neutral condition or a time when the gear ratio deviates from the gear ratio variable allowance range corresponding to the current gear ratio, and to indicate the status of the gear ratio immediately before the second timer gets started while the second timer is activated.

6. The transmission according to claim 2, wherein the determination means of gear ratio is configured to halt the second timer when the first timer starts.

7. The transmission according to claim 1, wherein the determination means is configured to stop the first timer and reset the measured given first time when the gear ratio deviates from the another gear ratio variable allowance range of the next step.

8. The transmission according to claim 7, wherein the measured first given time the first timer is configured to become longer the gear ratio goes from a step of high vehicle speed to another step of low vehicle speed.

9. The transmission according to claim 2, wherein the determination means of gear ratio is configured to start the second timer for measuring the second given time at an earlier of a time when the neutral sensor detects the neutral condition or a time when the gear ratio deviates from the gear ratio variable allowance range corresponding to the current gear ratio, and to indicate the status of the gear ratio immediately before the second timer gets started while the second timer is activated.

10. The transmission according to claim 7, wherein the determination means of gear ratio is configured to halt the second timer when the first timer starts.

11. The transmission according to claim 1, wherein the measured first given time of the first timer is configured to become longer as the gear ratio goes from a step of high vehicle speed to another step of low vehicle speed.

12. The transmission according to claim 2, wherein the determination means of gear ratio is configured to start the second timer for measuring the second given time at an earlier of a time when the neutral sensor detects the neutral condition or a time when the gear ratio deviates from the gear ratio variable allowance range corresponding to the current gear ratio, and to indicate the status of the gear ratio immediately before the second timer gets started while the second timer is activated.

13. The transmission according to claim 11, wherein the determination means of gear ratio step is configured to halt the second timer when the first timer starts.

14. The transmission according to claim 1, wherein the determination means of gear ratio is configured to start the second timer for measuring the second given time at an earlier of a time when the neutral sensor detects the neutral condition or a time when the gear ratio deviates from the gear ratio variable allowance range corresponding to the current gear ratio, and to indicate the status of the gear ratio immediately before the second timer gets started while the second timer is activated.

15. The transmission according to claim 1, wherein the determination means of gear ratio is configured to make the second timer halt when the first timer gets started.

* * * * *